United States Patent [19]

McMahon

[11] 4,206,260
[45] Jun. 3, 1980

[54] POLYETHYLENE INSULATION CONTAINING A TREE GROWTH-INHIBITING ALCOHOL

[75] Inventor: Eugene J. McMahon, Claymont, Del.

[73] Assignee: E. I. Du Pont de Nemours and Company, Wilmington, Del.

[21] Appl. No.: 962,179

[22] Filed: Nov. 20, 1978

Related U.S. Application Data

[63] Continuation-in-part of Ser. No. 809,910, Jun. 28, 1977, abandoned, Continuation-in-part of Ser. No. 709,266, Jul. 28, 1976, abandoned.

[51] Int. Cl.$^2$ .................. B32B 15/08; B32B 27/18; C08F 110/02; H01B 3/18
[52] U.S. Cl. .................. 428/379; 174/110 PM; 260/33.4 PQ; 260/45.95 P; 428/383; 428/461; 428/500; 528/495; 525/1; 525/387
[58] Field of Search .................. 174/110 R, 110 PM; 260/33.4 PQ, 45.95 P; 428/379, 383, 461, 500; 526/1, 57; 528/495

[56] References Cited

U.S. PATENT DOCUMENTS

| | | | |
|---|---|---|---|
| 2,451,743 | 10/1948 | Jarrett | 528/495 |
| 2,891,036 | 6/1959 | Stacey | 260/45.95 P |
| 2,956,983 | 10/1960 | Rindtorff | 260/45.95 P |
| 3,004,001 | 10/1961 | Robbins et al. | 260/45.95 P |
| 3,215,683 | 11/1965 | Mahlman | 528/495 |
| 3,219,622 | 11/1965 | Luciani et al. | 260/45.95 P |
| 3,244,687 | 4/1966 | Spindler | 528/495 |
| 3,337,519 | 8/1967 | Ledbetteo | 528/495 |
| 3,361,713 | 1/1968 | Meyer et al. | 526/57 |
| 3,372,153 | 5/1968 | Turner et al. | 528/495 |
| 3,622,555 | 11/1971 | Rothenbury | 528/495 |
| 3,773,556 | 11/1973 | Rowland et al. | 526/57 |
| 4,013,622 | 3/1977 | De Juneas et al. | 526/1 |

FOREIGN PATENT DOCUMENTS

| | | | |
|---|---|---|---|
| 2349740 | 10/1973 | Fed. Rep. of Germany | 526/57 |
| 1027139 | 4/1966 | United Kingdom | 526/57 |

Primary Examiner—J. C. Cannon

[57] ABSTRACT

Insulation particularly suitable for high voltage power cable consists essentially of low density polyethylene (or crosslinked polyethylene) and an effective amount of an alcohol of 6 to 24 carbon atoms which is a tree growth inhibitor capable of imparting at least a thousand-fold increase in electrical endurance as measured by an accelerated test procedure. Electrical trees can be initiated in the polyethylene in the presence of the alcohol. However, increased electrical endurance is obtained through inhibition of continued tree growth at that site.

A precursor composition for a preferred insulation contains (i) low density polyethylene, (ii) a peroxide crosslinking agent, and (iii) an alcohol of 8 to 12 carbon atoms.

58 Claims, No Drawings

POLYETHYLENE INSULATION CONTAINING A TREE GROWTH-INHIBITING ALCOHOL

This is a continuation-in-part application of Ser. No. 809,910, filed June 28, 1977, now abandoned, which is, in turn, a continuation-in-part application of Ser. No. 709,266, filed July 28, 1976, now abandoned.

BACKGROUND OF THE INVENTION

This invention relates to electrical insulation such as primary insulation which is particularly suitable for use in high voltage cable and to a composition of polyethylene which incorporates an additive providing resistance to electrical breakdown of the cable. More specifically, this invention relates to improving the resistance to electrical failure of low density polyethylene and crosslinked polyethylene.

Electrical failure of high voltage insulation is often initiated at contaminating particles. It is extremely difficult, if not impossible, to extrude solid organic insulation, such as polyethylene, on a conductor without any flaws. Even if the polyethylene manufacturer uses extremely clean techniques, contaminants can later be introduced in subsequent handling of the resin prior to final shaping. Another cause of electrical failure in the insulation is the presence of a void.

High voltage power cables insulated with insulating polymers are subject to dielectric breakdown by a mechanism known to the trade as electrical "treeing". Treeing is a relatively slow progressive degradation of an insulation caused by electron and ion bombardment of the insulation resulting in the formation of microchannels or tubes having a tree-like appearance, hence the name. A tree initiates at points of contamination or voids which are foreign to the polymeric insulation by the action of ionization (corona) during high voltage surges. Once a tree starts it usually grows, particularly during further high voltage surges, and at some undetermined time, dielectric failure can occur.

To overcome this problem, various additives have been disclosed, particularly in polyethylene or other polyolefin, which require an increase in applied voltage to cause initiation of a tree. This use of an additive attempts to prevent failure of the insulation by preventing any formation of trees.

Maloney U.S. Pat. No. 3,499,791 discloses a coating for an electrical high voltage cable comprising a polyethylene resin which contains an inorganic ionic salt of a strong acid and a strong Zwitter-ion compound. An insulated cable provides resistance to electrical breakdown and stress cracking under the influence of corona.

Kato et al., U.S. Pat. No. 3,956,420 discloses insulation with improved electrical breakdown resistance comprising polyolefin, a ferrocene compound and a substituted quinoline compound. Also disclosed in the patent is additional use of a small amount of polyhydric alcohol, dispersant, surfactant or unsaturated polymer or mixture thereof to obtain another improvement in electrical breakdown strength.

MacKenzie, Jr. U.S. Pat. No. 3,795,646 discloses an ethylene-containing polymer composition which exhibits improved ionization resistance under high voltage stress by employing a silicone fluid in a crosslinked polyethylene composition.

Japanese Pat. No. 14348/75 relates to wire cables with improved dielectric breakdown resistance provided by an insulation of polyethylene containing 0.1% by weight of an aromatic ketone.

German Pat. No. 2147684 discloses the concept of increasing the electrical breakdown resistance of polymers, especially polyethylene, by modifying the free path of charge carriers (electrons) by incorporating additional scatter centers or by reducing the crystallinity of the polymer.

Japanese Patent Application No. 7201988 discloses insulated power cable having improved breakdown resistance by providing an insulated layer of polyethylene, polypropylene, polycarbamate or polyester containing mica particles coated with hydrophobic insulating material of silicone oil, stearic acid, palmitic acid, or oleic acid.

Japanese Kokai Pat. No. 49/119,937 discloses electric insulating resin compositions which give an increase in dielectric breakdown voltage through mixing into a resin composition such as polyethylene a ferrocene-aldehyde (or ketone) polymer having ferrocene groups or a mixture of the ferrocene containing polymer and a higher alcohol.

SUMMARY OF THE INVENTION

This invention is directed to a composition of matter and to an electrical conductor coated with such composition which consists essentially of polyethylene or crosslinked polyethylene and an effective amount of an alcohol of 6 to 24 carbon atoms which is a tree growth inhibitor capable of providing at least a thousand-fold increase in electrical endurance of polyethylene as measured by an electrical endurance test procedure.

Suitable materials include:

(a) a composition of polyethylene and a tree growth inhibitor of at least one alcohol containing between 6 to 24 carbon atoms, (b) the composition of (a) with a peroxide crosslinking agent, (c) the composition of (a) or (b) which has been crosslinked and (d) the composition of (a), (b) or (c) as an insulation on an electrical conductor.

DETAILED DESCRIPTION OF THE INVENTION

A composition which is particularly useful as insulation for high voltage cable consists essentially of polyethylene or crosslinked polyethylene and a higher alcohol which improves electrical endurance. An accelerated test procedure referred to in Test Method A herein shows the presence of the alcohol inhibits electrical tree growth (but not tree formation) and results in at least a thousand-fold increase in electrical endurance of polyethylene. Such test is believed to provide a direct correlation with long term electrical endurance of such insulation on a conductor, i.e., an increased useful life of insulation when employed in its intended use.

As employed in the present specification the term "polyethylene" or "crosslinked polyethylene" is limited to a homopolymer or copolymer containing no less than 85 weight percent ethylene polymerized units and no less than 95 weight percent of olefin polymerized units. These polymers would conform to the definition of "polyethylene plastics" defined in 1976 Annual Book of ASTM Standards, 1976, Part 36, page 70 as "plastics or resins prepared by the polymerization of no less than 85% ethylene and no less than 95 weight percent of total olefins". A preferred polyethylene or a crosslinked polyethylene contains about 100 weight percent ethylene polymerized units.

Suitable olefins which can be employed as comonomers include propylene, butene-1, hexene-1, octene-1 and decene-1. Other comonomers include norbornene, butadiene, styrene, methacrylic acid, vinyl acetate, ethyl acrylate, isobutyl acrylate, and methyl vinyl ether.

The term "polyethylene" is limited to a polymer which is substantially free of crosslinks while the term "crosslinked polyethylene" defines a polymer containing crosslinks. These crosslinks can be formed by any mechanism such as by use of irradiation or a peroxide crosslinking agent.

Low density polyethylene or crosslinked polyethylene is suitable for use in the present invention. The higher density polyethylenes are not suitable for use in the present invention because there is little or no improvement, certainly no thousand-fold improvement, in the electrical endurance thereof upon addition of an alcohol as specified herein. "Low density" refers to a polyethylene or crosslinked polyethylene which has a density up to about 0.92 g/cc. Reference is also made to ASTM D 1248-74 for the term "low density".

Additionally, rigidity of an insulation is a factor in selection of a polyethylene for some uses, e.g., flexibility is necessary in transmission line cable.

The necessary additive to polyethylene or crosslinked polyethylene in the present invention is an alcohol of 6 to 24 carbon atoms and most preferably 8 to 12 carbon atoms. Preferred alcohols are aliphatic and/or monohydric. The alcohols can be either straight or branched chain. Suitable examples include n-hexyl, n-heptyl, n-octyl, n-decyl, n-dodecyl, n-tetradecyl, stearyl, and eicosyl alcohols, benzyl alcohol, 2-decanol, 4-decanol, cyclohexanol, 3-methylheptanol-3, 2-methyloctanol-2, 2-phenylpropanol-2, and the like. The alcohols useful herein are also referred to in this specification as "tree growth inhibitors".

The alcohol can be added by any conventional method, including mixing with the solid polyethylene prior to compounding or extrusion, injection into molten polyethylene, diffusion into solid polyethylene or crosslinked polyethylene of alcohol applied by spraying, soaking or vapor contacting, and contacting an article comprising polyethylene or crosslinked polyethylene with liquid or vapor-phase alcohol.

A test method, Test Method A, for determining whether an additive is suitable to increase electrical endurance at least a thousand-fold employs polyethylene and excludes a peroxide crosslinking agent and crosslinked polyethylene. Since conversion of polyethylene to crosslinked polyethylene through use of a peroxide crosslinking agent can result in increase in electrical endurance, the addition of a peroxide crosslinking agent can mask to some degree the improvement imparted by a tree growth inhibitor. However, modification of Test Method A to employ crosslinked polyethylene rather than polyethylene has proven satisfactory as a screening technique to demonstrate whether some improvement exists in accelerated electrical endurance through addition of an additive. Such modification of Test Method A is not sufficient to determine if at least a thousand-fold improvement in electrical endurance exists in all instances.

In Test Method A initiation of a tree is necessary in a sample of insulation. Crosslinked polyethylene allows visual inspection of a tree. In contrast, polyethylene is opaque and does not permit visual determination of a tree without cutting into the polyethylene. Therefore, in Test Method A using polyethylene, it is generally necessary to employ several samples and destroy one of the samples to determine if a tree has been grown under initial voltage conditions.

While Test Method A excludes the presence of a peroxide crosslinking agent to determine if an additive imparts at least a thousand-fold increase in accelerated electrical endurance to polyethylene, the scope of the present invention includes a composition of matter consisting essentially of polyethylene or crosslinked polyethylene (crosslinked by any mechanism including use of a peroxide) and an alcohol and use of such composition thereof with an electrical conductor.

A concentration of alcohol necessary to impart at least a thousand-fold increase in time to failure as measured by Test Method A is referred to as "an effective amount". This concentration (based on weight of alcohol to weight of polyethylene) directly results in at least the thousand-fold increase in life in polyethylene which is not crosslinked. It is understood for crosslinked polyethylene that an effective amount of an alcohol is taken to be the same concentration of alcohol which would be necessary to bring about at least a thousand-fold increase in polyethylene. Generally, an alcohol will be present in a weight of about 2.0 to about 10% of the weight of the polyethylene or crosslinked polyethylene and more preferably about 2.5 to about 5% by weight.

Larger concentrations of alcohol can be beneficially employed. However, such additive can increase the power factor of the polyethylene or crosslinked polyethylene and an excess should not be employed where a higher power factor is detrimental, e.g., in high voltage transmission lines. Preferably in such use, the insulating composition will have a power factor not greater than 1%, preferably not greater than 0.5%.

Suitable materials include (a) a composition of polyethylene and at least one alcohol containing between 6 to 24 carbon atoms, (b) the composition of (a) with a peroxide crosslinking agent, (c) the composition of (a) or (b) which has been crosslinked and (d) the composition of (a), (b) or (c) as an insulation on an electrical conductor.

A most preferred composition in the present invention contains polyethylene, a peroxide crosslinking agent and a tree growth inhibitor of at least one alcohol of 8 to 12 carbon atoms. This most preferred composition is a precursor to an insulation containing crosslinked polyethylene and its use with an electrical conductor.

Conventional peroxide crosslinking agents well known in the prior art for crosslinking polyethylene can be employed herein and include di-alpha-cumyl peroxide, 2,5-bis(t-butyl peroxy-2,5-dimethyl hexane, 2,5-dimethyl-2,5-di(t-butyl peroxy)hexyne-3, etc.

If a peroxide crosslinking agent is soluble in the alcohol, this agent can be dissolved in such alcohol and both added to polyethylene. The polyethylene containing these additives normally is not crosslinked until after application to an electrical conductor.

For purposes of explanation and without being bound to any theory concerning the manner in which an alcohol functions for tree growth inhibition, such alcohol has the ability to diffuse through polyethylene or crosslinked polyethylene and into voids in the insulation. Tree growth in the insulation follows initial formation of microchannels and produces a tree-like appearance. Tree growth will ordinarily continue until dielectric failure of the insulation occurs. In the present case, however, it is believed that an alcohol as defined in the present invention diffuses into the voids and impedes the electron and ion bombardment. Inhibition of tree growth after initiation translates to an increase in electrical endurance of the insulation.

The underlying purpose in the test procedure is to mimic a mechanism which causes dielectric failure. In practice, trees generally initiate in power cables during high voltage surges, e.g., due to switching transients, lightning bolts, etc. Thereafter failure of the insulation can occur at normal operating stress or particularly during additional high voltage surges. In the composition of this invention an alcohol functioning for tree growth inhibition extends useful life of the insulation by inhibiting growth of trees after their initiation and preventing premature failure of the insulation.

Unlike conventional test procedures in the prior art which determine dielectric strength of an insulation, Test Method A is considered to give a correlation to useful life of the insulation. In this latter test, a high AC voltage initially applied across electrodes within the insulation causes tree initiation without resulting in failure of the insulation. This tree initiation is followed by a rest period in which a voltage is not imposed for at least about 24 hours. Thereafter, time to failure of the insulation is measured with 12,000 volts impressed between electrodes separated by 2 mm, i.e., with an average electrical stress, if the field were uniform, of 6,000 volts/mm (as described in Test Method A). The field, however, is intensified as a result of the small diameters of the shaped ends of the electrodes to a value greater than 6,000 volts/mm.

The accelerated electrical endurance test is believed to provide a useful correlation to the extended life of insulation which is employed for prolonged time periods, e.g., at least 30 years. It is, of course, impractical to run such long term testing. Also, only a relatively few samples which actually fail in long term testing and a statistical study would be necessary. With the presence of the alcohol in a composition consisting essentially of polyethylene, it is believed that in normal use no failure based on dielectric breakdown of polyethylene will occur.

The test for determining an increase in electrical endurance is referred to as Test Method A and comprises the following:

TEST METHOD A

Polyethylene for testing in accordance with this method is initially molded into a block termed herein as a "SPING" (which is an acronym for solid phase internal needle gap specimen). A SPING is 25 mm square by 6 mm thick and contains two electrodes embedded therein lengthwise and in line, equidistant from the faces and from the opposite edges, with the tips spaced 2 mm apart at the center of the block. Each electrode is about 30 mm in length and about 0.6 mm in diameter. One electrode has a cone-shaped point at a 30° included angle with a radius of 5 $\mu$m and is the high voltage electrode; a second electrode has a 0.3 mm radius hemisphere ground on one end and is the ground electrode.

A minimum of five SPINGS are placed on test at one time. Each SPING is placed under silicone oil which prevents surface flashover. The high voltage electrode is connected to a high voltage bus while the ground electrode is connected to a spaced pair of 6.25 centimeter spheres connected to ground through a 1 meg-ohm resistor. A gap is set sufficiently wide between the spheres to achieve a voltage sufficient to initiate a tree in the SPING. For example, with the spheres set at 0.762 centimeter gap, a voltage (60 HZ) increasing at a rate of 500 volts/sec is applied until a discharge occurs between the two spheres. Before this breakdown occurs, the stress on the specimen is essentially zero; however, the instant the air gap breaks down, the applied voltage plus a radio frequency signal developed by the arc is impressed across the specimen electrodes and is maintained for 1 to 2 seconds, so that a tree is generated. The voltage required to initiate a tree will vary with the composition being tested. For polyethylene which contains an alcohol in accordance with the present invention, a voltage of 35 to 40 kv. is required. For polyethylene which contains other additives, the voltage required may be higher or lower, but the voltage to be used is easily determined by visual examination of each specimen to see whether a tree has been initiated.

After the tree has been initiated, the SPING is held without application of voltage for about 24 hours before placing on high voltage of 12,000 volts applied between the electrodes (an average applied voltage of 6000 v/mm). The time in hours necessary for the middle sample to fail (e.g. third out of five, fifth out of nine, in terms of time to failure) is measured and called electrical endurance.

Failure is indicated by dielectric breakdown. When failure occurs, a tree gaps the two electrodes resulting in a sudden increase in current (which can be indicated on a recording ammeter) and terminates the test on that specimen.

The tree growth inhibitor in the present invention functions in a different manner from prior art additives to obtain an improved result. The prior art additives are generally disclosed as compounds which, when incorporated into polyethylene or other suitable insulating materials, will require a higher characteristic voltage to initiate a tree at a needle tip. (These teachings generally employ a sharp needlepoint embedded in the sample. The manner varies in which a second electrode is present). The characteristic voltage is that voltage wherein one-half of the samples on test will initiate a tree in one hour. This is determined by examining several groups of specimens at several different voltages. The test is concluded when the characteristic voltage is found.

In contrast, in the present invention, a tree growth inhibitor is not for the purposes of preventing tree initiation but solely for the purpose of suppressing growth of a tree after it has been initiated.

Although the present invention includes a composition of polyethylene or crosslinked polyethylene and an alcohol, it is understood that other conventional additives can be and are normally present in the composition. These additives include antioxidants, e.g., polymerized trimethyldihydroquinone; lubricants, e.g., calcium stearate; pigments, e.g., titanium dioxide; fillers, e.g., glass particles; reinforcing agents, e.g., fibrous materials such as asbestos and glass fibers, etc.

Although an insulation of polyethylene or crosslinked polyethylene containing a tree-growth inhibitor is particularly suitable for power cable for carrying voltage at least 15 kv, such as 15 to 220 kv, it is likewise suitable for lower or higher voltage applications. In electrical cable, in conformance to prior art teachings, a semiconducting layer would be interspaced between an electrical conductor and an insulating layer. Such semiconducting layer conventionally includes an insulating composition which also contains carbon black.

To illustrate the present invention, the following examples are provided:

IDENTIFICATION OF INSULATION COMPOSITION FOR CONTROL A AND EXAMPLES 1–4.

(A) Polyethylene: Homopolymer
   Melt Index (ASTM D-1238) 1.8 grams per 10 minutes
   Density 0.918 gram per cubic centimeter (measured in accordance with ASTM D-1505-68 (Reapproved 1975))
(B) Antioxidant: 4,4'-thiobis(6-tert-butyl-m-cresol) 1500 ppm
(C) Tree Growth Inhibitor: n-dodecyl alcohol, except for Control A

| Control A (No Tree Growth Inhibitor) | | |
|---|---|---|
| SPING No. | Order of Failure | Test Method A Time to Failure, Hours |
| 1 | 1 | 0.10 |
| 2 | 2 | 0.25 |
| 3 | 5 | 0.38 |
| 4 | 4 | 0.35 |
| 5 | 3 | 0.25 |

EXAMPLES 1 AND 2

In Example 1, n-dodecyl alcohol was added to polyethylene pellets by tumble blending followed by extrusion mixing. In Example 2, the n-dodecyl alcohol was injected using a gear pump into molten polyethylene in the mixing zone of the extruder. In each of Examples 1 and 2, the final concentration of the n-dodecyl alcohol was 3% by weight in the polyethylene as measured by infrared spectrometry. Nine SPINGS were prepared for each Example and placed on test using Test Method A.

The nine SPINGS for Examples 1 and 2 were taken off test without any having failed after 1960 hours and 1730 hours respectively. Electrical endurance would thus be in excess of 1960 hours and 1730 hours, respectively.

Continued testing of the same SPINGS was carried out. The nine SPINGS for Examples 1 and 2 were later taken off test without any having failed after a total of 4000 hours. In each case, electrical endurance would thus be in excess of 4000 hours.

Comparison of Examples 1 and 2 with Control A shows that increase of electrical endurance would be well in excess of a thousand-fold.

EXAMPLES 3 AND 4

In these examples, the additive was also n-dodecyl alcohol in a concentration of about 3 weight percent in the polyethylene as measured by infrared spectrometry. In Example 3, the polyethylene was mixed with the alcohol in a Banbury mixer while in Example 4 the mixing was done in a Brabender mixer. Nine SPINGS were prepared from the composition of each Example and were placed on test by Test Method A. All SPINGS of Example 3 were removed from test after 850 hours while in Example 4 all SPINGS were removed from test after 720 hours. No SPINGS had failed in either Example 3 or 4. The electrical endurance was thus greater than 850 and 720 hours, respectively. The increase in electrical endurance compared with Control A is in excess of a thousand-fold.

In the remaining examples, (Examples 5 to 10) and in Controls B to D, Test Method A was still used, but with the minor changes that each electrode was 1.0 mm in diameter (instead of 0.6 mm), and the second electrode was ground on one end to a 0.5 mm radius hemisphere (instead of 0.3 mm). These changes were made simply for ease in fabrication of the shape of the end of the electrode by machining, since a thickness of 1.0 mm provides less flexibility than 0.6 mm. Parallel tests carried out with the thicker and thinner electrodes in SPINGS made from the same insulation composition verified that the same test results were obtained in each case. The test procedure using the thicker electrodes is therefore still referred to herein as Test Method A.

EXAMPLES 5–10

In these examples the insulation composition was similar to that of Examples 1–4; it was still a polyethylene homopolymer of density 0.918, but had a melt index of 2.5 and contained ca.750 ppm. of the same antioxidant, and different tree growth inhibitors were used. In each case the amount of tree growth inhibitor in the polyethylene was 3% by weight.

In each of Examples 5 through 10 the tree growth inhibitor was added to polyethylene pellets by tumble blending followed by extrusion mixing. Four SPINGS were prepared for each example and placed on test using Test Method A. (When four SPINGS are placed on test, the electrical endurance would be greater than the time for the second SPING to fail, but less than the time for the third SPING to fail.)

In Example 5, the tree growth inhibitor was n-dodecyl alcohol, a primary alcohol. All SPINGS were removed from test after 600 hours. No SPINGS had failed. The electrical endurance was thus greater than 600 hours.

In Example 6, the tree growth inhibitor was cyclohexanol, a primary alcohol. All SPINGS were removed from test after 768 hours. No SPINGS had failed. The electrical endurance was thus greater than 768 hours.

In Example 7, the tree growth inhibitor was benzyl alcohol, a primary alcohol. All SPINGS were removed from test after 720 hours. No SPINGS had failed. The electrical endurance was greater than 720 hours.

In Example 8, the tree growth inhibitor was 2-decanol, a secondary alcohol. All SPINGS were removed from test after 552 hours. No SPINGS had failed. The electrical endurance was greater than 552 hours.

In Example 9, the tree growth inhibitor was 4-decanol, a secondary alcohol. All SPINGS were removed from test after 600 hours. No SPINGS had failed. The electrical endurance was greater than 600 hours.

In Example 10, the tree growth inhibitor was 2-phenyl-2-propanol, a tertiary alcohol. All SPINGS were removed from test after 552 hours. No SPINGS had failed. The electrical endurance was greater than 552 hours.

In all of Examples 5–10, the increase in electrical endurance compared with Control A is in excess of a thousand-fold.

CONTROLS B, C AND D

In Controls B to D, higher density polyethylene was tested.

Control B used polyethylene which has a density of 0.960 g/cc, and which contains 100 ppm "Irganox 10—10" antioxidant. The polyethylene pellets and 3% n-dodecyl alcohol were mixed by tumble blending, followed by extrusion mixing.

In Control C, 88.11% by weight of pellets of the same polyethylene of density 0.960 g/cc and 11.89% by weight of pellets of polyethylene of density 0.918 g/cc (which contains 700 ppm "Sanotox R" antioxidant) were tumble blended, further mixed by extrusion in a double-screw extruder, and pelletized. Control D was similar except that 52.38% by weight of 0.960 density polyethylene and 47.62% by weight of 0.918 density polyethylene were used. In each case, the pellets of the blend were then tumble blended with 3% n-dodecyl alcohol, followed by extrusion mixing.

SPINGS of each composition were then fabricated for test purposes. A small chip of polymer was removed from one SPING of each composition to measure its density (ASTM D-1505-68). The densities were: Control B, 0.957 g/cc; Control C, 0.949 g/cc; and Control D, 0.936 g/cc.

Five SPINGS of each composition were placed on test using Test Method A. In each of Controls B, C and D, all five SPINGS failed before one day had elapsed. Accordingly, the electrical endurance in each case was less than 24 hours.

What is claimed is:

1. An article comprising an electrical conductor and an insulating layer consisting essentially of
   (a) low density polyethylene, and
   (b) an effective amount of at least one alcohol of 6 to 24 carbon atoms;
   said alcohol capable of introducing at least a thousand-fold increase in electrical endurance of the polyethylene as measured by Test Method A.

2. The article of claim 1 wherein (a) has been crosslinked by a peroxide crosslinking agent.

3. The article of claim 1 wherein said insulating layer excludes use of a peroxide crosslinking agent.

4. The article of claim 1 wherein the polyethylene contains about 100 weight percent ethylene polymerized units.

5. The article of claim 1 with said insulating layer having a power factor no greater than 0.5%.

6. The article of claim 1 wherein said alcohol is aliphatic.

7. The article of claim 1 wherein said alcohol is monohydric.

8. The article of claim 1 wherein said alcohol contains 8 to 12 carbon atoms.

9. The article of claim 8 wherein said alcohol is n-decyl alcohol.

10. The article of claim 8 wherein said alcohol is n-dodecyl alcohol.

11. The article of claim 1 wherein in the insulating layer said alcohol is present in an amount of 2.0 to 10% of the weight of the crosslinked polyethylene.

12. The article of claim 11 wherein said amount is 2.5 to 5% by weight.

13. The article of claim 1 which is an electrical cable.

14. The article of claim 1 with a semiconducting layer interspaced between the electrical conductor and said insulating layer.

15. The article of claim 1 wherein the density of said low density polyethylene is up to about 0.92 g/cc.

16. The article of claim 1 wherein the density of said low density polyethylene is about 0.918 g/cc.

17. An article comprising an electrical conductor and an insulating layer consisting essentially of
    (a) low density crosslinked polyethylene;
    (b) an effective amount of at least one alcohol of 6 to 24 carbon atoms;
    said alcohol capable of introducing at least a thousand-fold increase in electrical endurance of polyethylene as measured by Test Method A.

18. The article of claim 17 wherein (a) has been crosslinked by a peroxide crosslinking agent.

19. The article of claim 17 wherein the polyethylene contains about 100 weight percent ethylene polymerized units.

20. The article of claim 17 with said insulating layer having a power factor no greater than 0.5%.

21. The article of claim 17 wherein said alcohol is aliphatic.

22. The article of claim 17 wherein said alcohol is monohydric.

23. The article of claim 17 wherein said alcohol contains 8 to 12 carbon atoms.

24. The article of claim 23 wherein said alcohol is n-decyl alcohol.

25. The article of claim 23 wherein said alcohol is n-dodecyl alcohol.

26. The article of claim 17 wherein the insulating layer said alcohol is present in an amount of 2.0 to 10% of the weight of the crosslinked polyethylene.

27. The article of claim 26 wherein said amount is 2.5 to 5% by weight.

28. The article of claim 17 which is an electrical cable.

29. The article of claim 17 wherein the density of said low density polyethylene is up to about 0.92 g/cc.

30. The article of claim 17 wherein the density of said low density polyethylene is about 0.918 g/cc.

31. A composition of matter consisting essentially of:
    (a) low density polyethylene, and
    (b) an amount of at least one straight or branched chain monohydric alcohol of 6 to 24 carbon atoms effective to introduce at least a thousand-fold increase in electrical endurance of the polyethylene as measured by Test Method A.

32. The composition of claim 31 excluding a peroxide crosslinking agent.

33. The composition of claim 31 wherein the polyethylene contains about 100 weight percent ethylene polymerized units.

34. The composition of claim 31 wherein said alcohol is aliphatic.

35. The composition of claim 31 wherein said alcohol contains 8 to 12 carbon atoms.

36. The composition of claim 31 wherein said alcohol is present in an amount of 2.0 to 10% of the weight of the polyethylene.

37. The composition of claim 36 wherein said amount is 2.5 to 5% by weight.

38. The composition of claim 31 wherein the density of said low density polyethylene is up to about 0.92 g/cc.

39. The composition of claim 31 wherein the density of said low density polyethylene is about 0.918 g/cc.

40. A composition of matter consisting essentially of:
    (a) low density polyethylene, (b) an amount of at least one monohydric alcohol of 6 to 24 carbon atoms effective to introduce at least a thousand-fold increase in electrical endurance of the polyethylene as measured by Test Method A, and (c) a peroxide crosslinking agent.

41. A composition of matter consisting essentially of:
(a) low density polyethylene, and
(b) an amount of n-decyl alcohol effective to introduce at least a thousand-fold increase in electrical endurance of the polyethylene as measured by Test Method A.

42. A composition of matter consisting essentially of:
(a) low density polyethylene, and
(b) an amount of n-dodecyl alcohol effective to introduce at least a thousand-fold increase in electrical endurance of the polyethylene as measured by Test Method A.

43. A composition of matter consisting essentially of
(a) low density crosslinked polyethylene;
(b) an amount of at least one monohydric alcohol of 6 to 24 carbon atoms effective to introduce at least a thousand-fold increase in electrical endurance of polyethylene as measured by Test Method A.

44. The composition of claim 43 wherein (a) has been crosslinked by a peroxide crosslinking agent.

45. The composition of claim 43 wherein the polyethylene contains about 100 weight percent ethylene polymerized units.

46. The composition of claim 43 with a power factor no greater than 0.5%.

47. The composition of claim 43 wherein said alcohol is aliphatic.

48. The composition of claim 43 wherein said alcohol contains 8 to 12 carbon atoms.

49. The composition of claim 48 wherein said alcohol is n-decyl alcohol.

50. The composition of claim 48 wherein said alcohol is n-dodecyl alcohol.

51. The composition of claim 43 wherein said alcohol is present in an amount of 2.0 to 10% of the weight of the crosslinked polyethylene.

52. The composition of claim 51 wherein said amount is 2.5 to 5% by weight.

53. The composition of claim 43 wherein the density of said low density polyethylene is up to about 0.92 g/cc.

54. The composition of claim 43 wherein the density of said low density polyethylene is about 0.918 g/cc.

55. In a process of forming a composition containing low density polyethylene and a peroxide crosslinking agent, said agent capable of dissolving in an alcohol of 6 to 24 carbon atoms, the improvement comprising:
(a) dissolving the peroxide in said alcohol; and
(b) adding the peroxide and the alcohol to said polyethylene.

56. The process of claim 55 wherein said alcohol is an alcohol of 8 to 12 carbon atoms.

57. The process of claim 55 wherein the density of said low density polyethylene is up to about 0.92 g/cc.

58. The process of claim 55 wherein the density of said low density polyethylene is about 0.918 g/cc.

* * * * *